Figure 1:
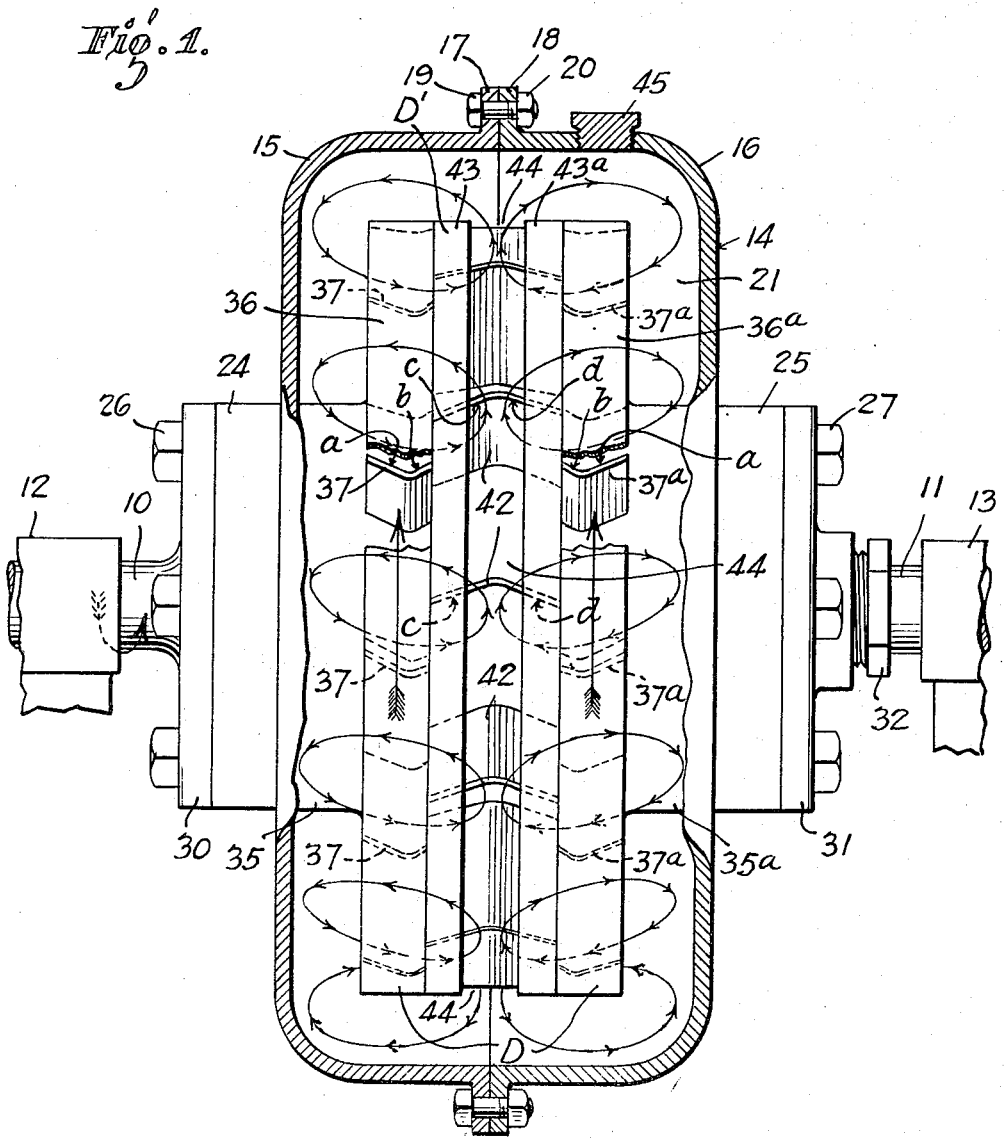

Feb. 22, 1949.  G. W. PETERSON  2,462,223
TURBINE PUMP TYPE HYDRAULIC COUPLING
Filed April 13, 1946  2 Sheets-Sheet 1

INVENTOR.
GUST W. PETERSON
BY
Frederick Diehl
ATTORNEY

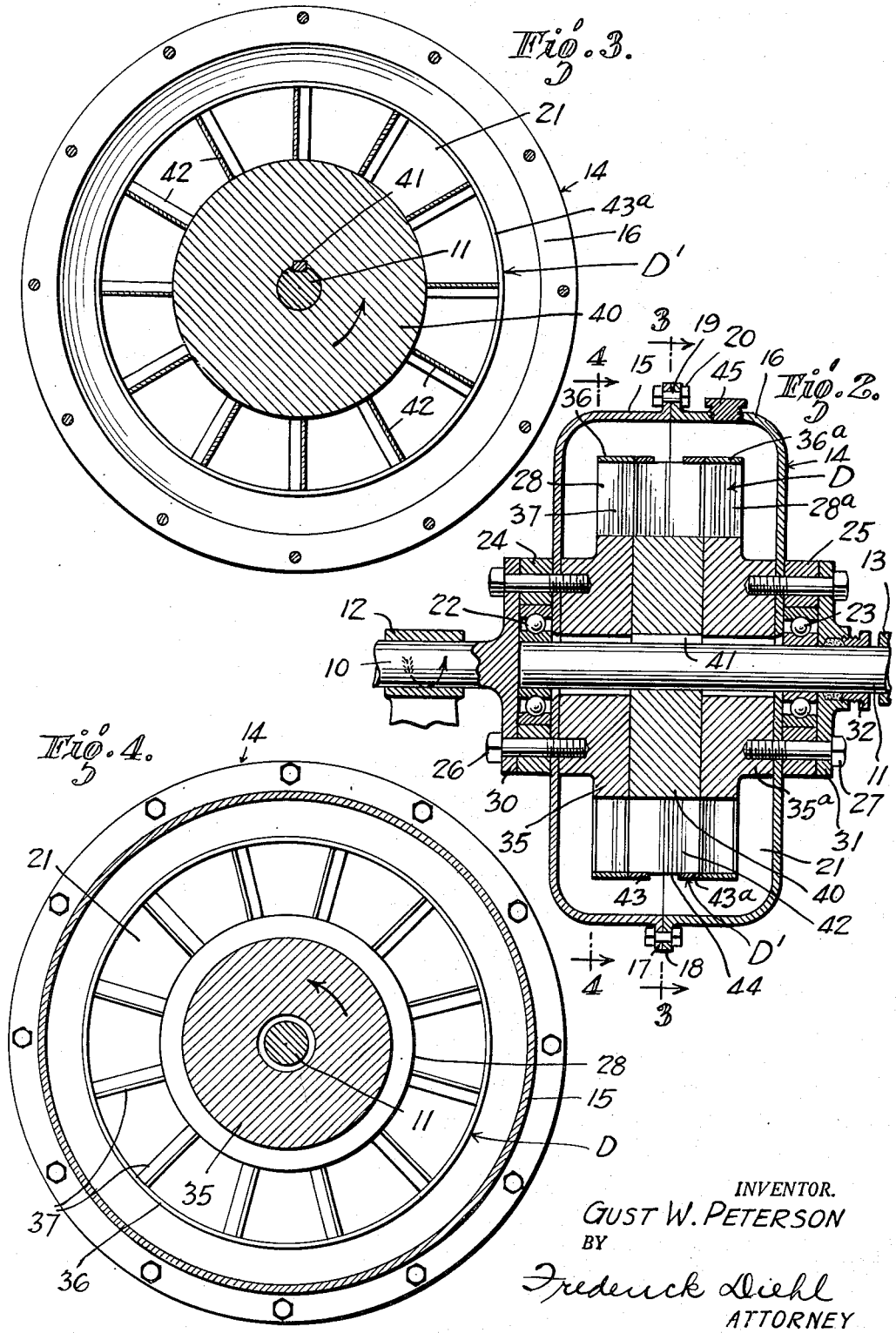

Patented Feb. 22, 1949

2,462,223

UNITED STATES PATENT OFFICE 2,462,223

TURBINE PUMP TYPE HYDRAULIC COUPLING

Gust W. Peterson, Los Angeles, Calif.

Application April 13, 1946, Serial No. 662,014

8 Claims. (Cl. 60—54)

This invention relates generally to fluid displacement mechanisms, and more particularly to fluid couplings by which power applied to a driving element is transmitted to a driven element through the medium of energy derived from a body of liquid when subjected to rotational force of the driving element in a manner to effect a continuous circulation of the liquid from the driving element to the driven element and back to the driving element.

The primary object of the present invention is to provide a fluid or hydraulic coupling which is structurally characterized by a novel construction, arrangement and functional relationship of driving and driven elements which removes the coupling from the prior art centrifugal and vortex pump types of couplings and transmissions with their comparatively low efficiency, and enables the power applied to the driving element to develop maximum torque at the driven element by reducing hydraulic losses to a minimum, as well as minimizing frictional losses to the extent of obviating excessive heating of the coupling under the most severe operating conditions, all to the end of obtaining maximum power transmitting efficiency by the liquid throughout the wide range of speed ratios involved in the propulsion of automobiles and other mechanisms requiring variable speeds of the driving element and/or the driven element.

More specifically, it is an object of this invention to provide a fluid coupling of the above described character, which, in a preferred embodiment, includes co-axially related driving and driven elements operating in a liquid-containing chamber and provided with vanes, with the driven element being interposed between two axially spaced sections of the driving element, which sections are peripherally shrouded or closed, whereas only those portions of the driven element adjacent to the sections of the driving element are peripherally shrouded or closed, so as to leave a continuous annular peripheral discharge slot, all to the end that during the operation of the invention, liquid will be drawn from the outer intake sides of the driving element sections between the vanes thereof and be forced by the vanes from the inner or discharge sides of the sections to impinge against the vanes of the driven element, to thus develop pressure thereagainst acting to rotate the driven element in the direction of the driving element as the liquid is forced through the peripheral discharge slot of the latter and separates into two streams returning to the outer intake sides of the respective driving element sections for recirculation continuously, whereby to obtain exceptionally high operating efficiency from the liquid by its continuous smooth circulation in short, direct circuitous paths through the driving and driven elements.

With these and other objects in view, the invention resides in the combinations, arrangements and functional relationships of elements as set forth in the following specification and particularly pointed out in the appended claims.

In the accompanying drawings,

Figure 1 is a view showing in side elevation, partly in section, one form of fluid coupling mechanism embodying this invention, and diagrammatically illustrating the liquid circulatory paths present during operation of the mechanism;

Figure 2 is a reduced scale view of the fluid coupling in longitudinal axial section; and Figures 3 and 4 are transverse sectional views taken on the lines 3—3 and 4—4, respectively, of Figure 2.

Referring specifically to the drawings, the invention in its illustrated embodiment comprises co-axial shafts 10 and 11 journaled in suitable bearings 12 and 13, respectively, the shaft 10 preferably being the drive shaft and being coupled to a power plant such as the engine of an automobile, whereas the shaft 11 will constitute the driven shaft connected to the propeller shaft of the automobile. The shaft 10 may be directly connected to the crankshaft of the engine, as the fluid drag between the shafts 10 and 11 at idling speeds of the engine is insufficient to drive the propeller shaft, and the mechanism will automatically vary the speed ratio between the engine shaft and propeller shaft in accordance with variations in the load.

The shafts 10 and 11 co-act to mount a casing 14 composed of two cup-shaped parts 15 and 16 having annular flanges 17 and 18 through which extend bolts 19 provided with nuts 20. The casing defines a cylindrical chamber 21 and is provided with anti-friction bearings 22 and 23, the inner races of which are mounted on the shaft 11, whereas the outer races are mounted in annular holders 24 and 25.

Fixed to the respective parts 15 and 16 of the casing 14 by cap screws 26 and 27, are the co-axially arranged and axially spaced sections 28 and 28a of a driving element D, the screws 26 passing through the holder 24 and through a flange 30 on the end of the drive shaft 10 to rigidly secure the casing and the driving element D to the drive shaft for rotation therewith as a unit. The screws 27 pass through the holder 25 and through the flange 31 of a packing gland 32 receiving the driven shaft 11 to provide a fluid-tight seal around the shaft.

The sections 28 and 28a of the driving element D are identical in construction except that one is right hand and the other left hand, the section 28 being composed of a hub 35 freely passing the shaft 11, and into which the screws 26 are threaded, a rim 36 in the form of a flat ring, and vanes 37 which are radially arranged between the hub and rim and are equidistantly spaced circumferentially as shown in Figure 4. The vanes 37 are of the scoop-shape in cross section perpendicular to their lengths as typically shown in Figure 1. The section 28a is composed of a hub 35a also freely passinng the shaft 11, and into which the screws 27 are threaded, a rim 36a in the form of a flat ring, and vanes 37a which are of the same arrangement and shape as the vanes 37 but are oppositely disposed relatively thereto as clearly shown in Figure 1.

Interposed with a running fit between the sections 28 and 28a of the driving element D is a driven element D' composed of a hub 40 fixed rigidly to the driven shaft 11 by a key 41, from which hub projects radial vanes 42 equidistantly spaced as shown in Figure 3, and connected at their outer ends to rims 43 and 43a of the same diameter as the rims 36 and 36a and contiguous to the confronting edges of the latter. The rims 43 and 43a are spaced apart to provide therebetween a continuous peripheral slot or opening 44 between the vanes 42 for the passage of liquid.

The vanes 42 are of the symmetrical obtuse V-shape in cross section perpendicular to their lengths as shown in Figure 1. The rims 36, 36a of the driving element sections 28 and 28a serve as shrouds to close the peripheries of the sections across the full widths of the respective vanes 37, 37a, whereas the rims 43 and 43a of the driven element D' serve in a similar manner to close only those portions of the periphery of the element D' nearest to the sections 28 and 28a, so as to leave the above described slot 44 as the only peripheral opening of the elements, which is centrally located between the sides of the element D'.

The elements D and D' are spaced from the casing 14 at the periphery and along the sides thereof to the peripheries of those portions of the hubs 35 and 35a which abut the sides of the casing, so as to provide liquid circulating space in the chamber 21, which is unobstructed for the free circulation of liquid therethrough. A quantity of a suitable liquid such as oil with a high boiling point is supplied to the chamber 21 through a plug-controlled filling opening 45 to provide the driving connection between the driving and driven elements D and D', respectively, in the operation of the invention which is as follows:

When the drive shaft 10 is rotated by the engine in the direction of the arrows in Figures 1, 3 and 4, the body of liquid in the chamber 21 is set into rotary motion by the vanes 37 and 37a of the driving element D, which vanes, by virtue of the angle of incidence or attack of their leading surfaces a (Figure 1) create a hydraulic head in the liquid and draw liquid from that portion of the chamber 21 at the outer sides of the driving element D into the sections 28 and 28a, from which the liquid is directed by the reversely inclined inner ends b (Figure 1) of the vanes 37 and 37a against the oppositely inclined surfaces c and d of the vanes 42 of the driven element D', and is confined in the driving element sections by the shroud-forming rims 36 and 36a thereof, so as to react with maximum efficiency against the vanes 42 to set up a torque effecting rotation of the driven element D' and hence the driven shaft 11 in the same direction as the driving element D.

The liquid entering the opposite sides of the driven element D' from the two sections of the driving element D is initially confined against escape from the driven element by the shroud-forming spaced rims 43 and 43a thereof, and discharges from the driven element after reacting upon its vanes 42, through the central discharge slot 44 so as to return in two streams beyond the peripheries of the elements D and D' to the outer intake sides of the driving element D for recirculation continuously in the circuitous paths generally indicated by the arrow-bearing lines in Figure 1.

From the foregoing description, it will be manifest that the hydraulic head of the liquid acting upon the vanes 42 of the driven element D' is built up during movement of the liquid in short, smooth and direct paths continuously through the driving and driven elements, so that the momentum in the liquid does not react upon the driven element D to create counter-torque with its attending loss in efficiency. Furthermore, it will be evident that the invention consists of but a few relatively simple parts capable of being readily constructed and assembled by standard quantity production manufacturing methods.

It will also be appreciated that the symmetrical arrangement of the driving element sections 28 and 28a at opposite sides of the driven element D' eliminates end thrust on the shafts 10 and 11, as the axial forces imposed thereon by the actuating liquid are equal in both directions axially of the shafts. The clearance between the driving and driven elements need only be sufficient for a running fit between the parts to reduce leakage of liquid therebetween to a negligible minimum.

I claim:

1. A fluid coupling comprising: a liquid-containing chamber; co-axially arranged and rotatably mounted driving and driven elements, one of which is composed of axially spaced sections between which the other element is interposed, with the peripheral portions of the elements and the outer sides of said sections spaced from the wall of said chamber to provide an unobstructed annular liquid-circulating space around the elements; said elements having their peripheries closed except for an annular peripheral discharge opening in said driven element; and said elements having vanes operatively related for the vanes of the driving element to draw liquid thereinto from said liquid-circulating space and force the liquid into opposite sides of the driven element so as to develop a torque-reaction upon the vanes thereof and then discharge therefrom through said opening into said liquid-circulating space for recirculation by the driving element.

2. A fluid coupling comprising: a liquid-containing chamber; co-axially arranged and rotatably mounted driving and driven elements; the driving element being composed of axially spaced sections having closed peripheries and being provided with vanes, and the driven element being interposed between said sections and having vanes; the vanes of said sections having leading edges and being shaped to respond to rotation of the driving element in one direction, by drawing liquid from the outer intake sides of the sections at said leading edges and through the sections to impinge against the vanes of the driven element and create a torque-reaction upon the latter; the driven element having a flow-retarding peripheral outlet through which the liquid is discharged under pressure after impinging against said vanes, for the return of the liquid around the peripheries of the driving and driven elements to the outer intake sides of said sections, and recirculation by the latter.

3. A fluid coupling comprising: a liquid-containing chamber; co-axially arranged and rotatably mounted driving and driven elements; the driving element being composed of axially spaced sections having closed peripheries and open sides with vanes within the latter defining liquid passages between the vanes from one side of the sections to the other; the driven element having vanes and being interposed between said sections, with those portions of its periphery adjacent to the sections being closed while leaving the intermediate portion of the periphery open to provide a discharge passage for liquid; the vanes of said sections being shaped to draw liquid from the outer sides of the sections through the latter to impinge against the vanes of the driven element so as to torque-react thereupon and then discharge through said peripheral passage and return exteriorly of the peripheries of the elements to the outer sides of said sections for recirculation by the driving element.

4. A fluid coupling comprising: a liquid-containing chamber; co-axially arranged and rotatably mounted driving and driven elements, one of which is composed of axially spaced sections between which the other element is interposed, with the peripheral portions of the elements and the outer sides of said sections spaced from the walls of said chamber to provide an unobstructed annular liquid-circulating space around the elements; said sections having closed peripheries and being provided with vanes; the driven element having vanes and being closed at the portions of its periphery contiguous to the peripheries of said sections, with the intermediate portion of the periphery of the driven element being open to provide a fluid passage; said vanes of the driving and driven elements being so shaped that liquid will be drawn into the outer sides of the sections of the driving element from said liquid circulating space, and forced into opposite sides of the driven element so as to torque react upon the vanes thereof and then discharge therefrom into said liquid circulating space for recirculation by the driving element.

5. A fluid coupling comprising: a liquid-containing chamber; co-axially arranged and rotatably mounted driving and driven elements, one of which is composed of axially spaced sections between which the other element is interposed, with the peripheral portions of the elements and the outer sides of said sections spaced from the walls of said chamber to provide an unobstructed annular liquid-circulating space around the elements; said sections having driving vanes, and said driven element having vanes against which liquid circulated by the vanes of said sections is caused to develop a torque reaction; said driving and driven elements having means co-acting to close the peripheries of said sections and to leave an annular, peripheral opening in said driven element, whereby to compel liquid being circulated by said driving vanes to enter the sections from the liquid circulating space at the outer sides of the sections and to discharge from the inner sides thereof against the vanes of the driven element from which the liquid discharges through said peripheral opening so as to return to said liquid circulating space for recirculation by the driving element.

6. A fluid coupling comprising: a liquid-containing chamber; co-axially arranged and rotatably mounted driving and driven elements, one of which is composed of axially spaced sections between which the other element is interposed, with the peripheral portions of the elements and the outer sides of said sections spaced from the walls of said chamber to provide an unobstructed annular liquid-circulating space around the elements; said sections having driving vanes and annular rims closing the peripheries of the sections; the driven element having vanes, and annular rims of the same diameter as and contiguous to the rims of said sections, and being axially spaced to provide a discharge opening for liquid circulated by the driving vanes of said sections, to discharge into said fluid-circulating space after torque reaction of the liquid against the vanes of the driving element, for recirculation of the liquid by the driving vanes.

7. A fluid coupling comprising: a liquid containing chamber; co-axially arranged and rotatably mounted driving and driven elements, the former of which is composed of axially spaced sections between which the driven element is interposed, with the peripheral portions of the elements and the outer sides of the said sections spaced from the walls of said chamber to define an unobstructed annular liquid circulating space around the elements; said sections having circular series of vanes between which the sections open at their outer sides to the liquid circulating space and at their inner sides to the outer sides of the driven element; the driven element having a circular series of vanes between which liquid is discharged by the vanes of the sections to impinge against the vanes of the driven element; said sections having annular rims closing their peripheries to confine liquid between the vanes of the sections for circulation thereby, and said driven element having annular rims in abutting relation to the rims of said sections to close portions of the periphery of the driven element, and being axially spaced apart to provide an annular passage for the peripheral discharge of liquid from between the vanes of the driven element into the liquid circulating space.

8. A fluid coupling comprising: a liquid containing casing; co-axially arranged and rotatably mounted driving and driven elements, the former of which is composed of axially spaced sections having hubs fixed to the casing; the driven element being interposed between said sections, and the peripheral portions of the elements and the outer sides of the sections to the peripheries of their hubs being spaced from the walls of the casing to define an unobstructed annular liquid circulating space around the elements; said sections having circular series of vanes projecting from their hubs, and annular rims closing the peripheries of the sections; said driven element having a hub and a circular series of vanes projecting therefrom; said driven element having annular rims contiguous to the rims of said sections to close peripheral portions of the driven element, and being axially spaced to leave an annular peripheral slot for the discharge of liquid from the driven element, after acting upon the vanes thereof.

GUST W. PETERSON.

REFERENCES CITED

The following references are of record in the file of this patent:

UNITED STATES PATENTS

| Number | Name | Date |
|---|---|---|
| 1,428,506 | Garrison | Sept. 12, 1922 |
| 1,784,212 | Walker | Dec. 9, 1930 |
| 1,888,881 | Murphy | Nov. 22, 1932 |
| 2,363,962 | Fillmore | Nov. 28, 1944 |